Nov. 17, 1964  E. WIEDEMANN  3,157,806
SYNCHRONOUS MACHINE WITH SALIENT POLES
Filed Nov. 3, 1960
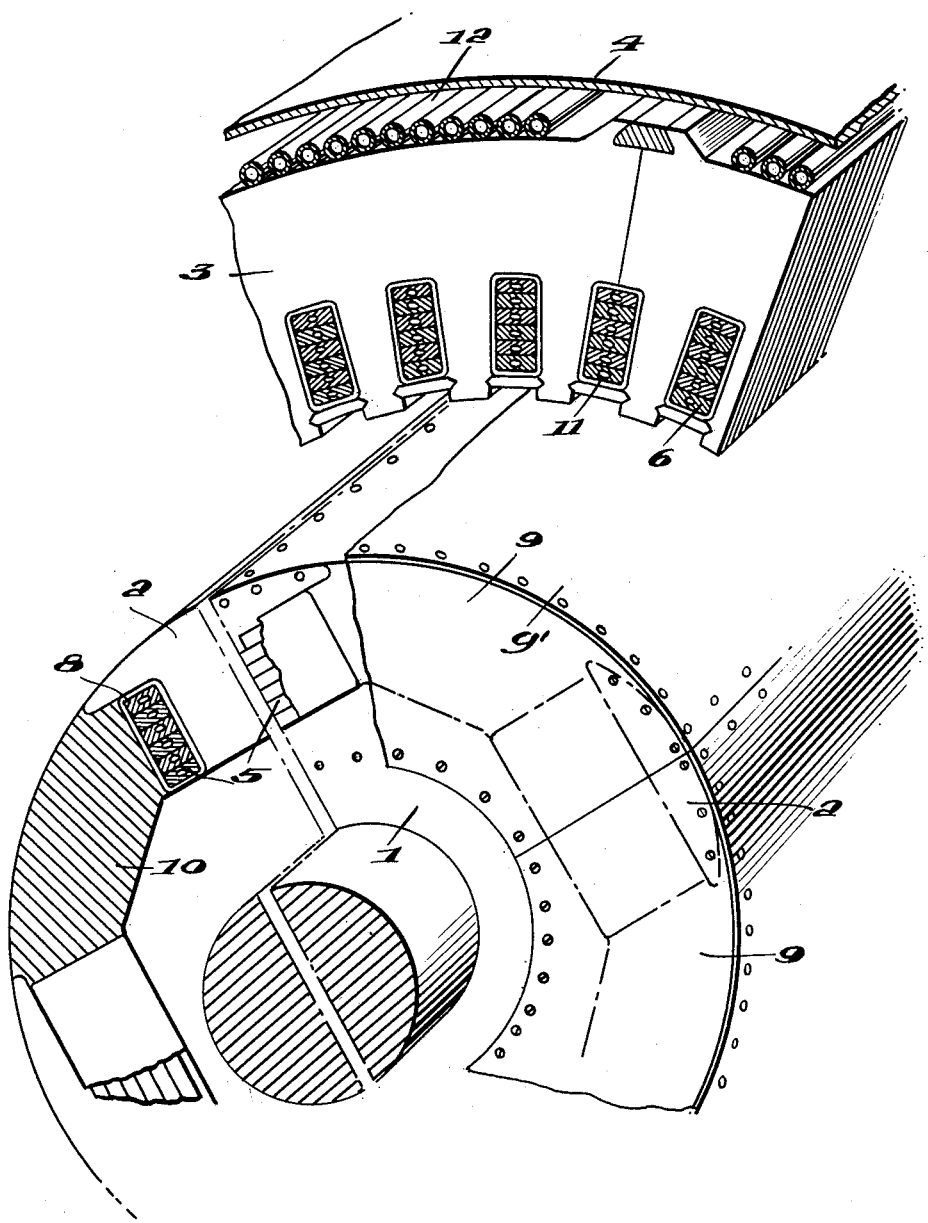
INVENTOR
Eugen Wiedemann
BY Pierce, Scheffler & Parker
ATTORNEYS United States Patent Office 3,157,806
Patented Nov. 17, 1964

3,157,806
SYNCHRONOUS MACHINE WITH
SALIENT POLES
Eugen Wiedemann, Wettingen, Aargau, Switzerland, assignor to Aktiengesellschaft Brown, Boveri & Cie, Baden, Switzerland, a joint-stock company
Filed Nov. 3, 1960, Ser. No. 66,960
Claims priority, application Switzerland Nov. 5, 1959
5 Claims. (Cl. 310—64)

Synchronous machines with salient poles are normally cooled with air, the air being circulated with an additional fan by the centrifugal action of the rotating magnet wheel assembly. The resulting ventilation- and surface-friction losses represent, as known, a considerable portion of the total losses.

The object of the invention is to limit the above mentioned losses in this type of machine to a minimum, and thus to increase the efficiency, particularly at partial load. According to the invention this is achieved in this way that the pole coil conductors are provided with a liquid cooling system, and the gaps between adjacent salient poles are completely closed by wall surfaces which can be applied radially at opposite ends of the rotor and also peripherally at the circumference of the rotor.

The cooling of the rotor winding is effected according to the invention, for example, with water, which flows through cooling channels into the coil conductor. But it is also possible to use another liquid for this purpose.

The form of the rotor required for reducing the ventilation- and surface-friction losses can be obtained preferably by filling the gaps between adjacent poles with a non-magnetic material. But it is also possible, instead of using these fillers, to seal the gaps between adjacent poles to the outside by an arrangement of walls. These walls may cover the portions of the gaps at the periphery of the rotor and present a substantially cylindrical rotor surface and/or the walls may cover the gaps at the sides of the poles i.e. at opposite ends of the poles.

In order to eliminate the heat loss in the stator, it was customary up to now to supply the cooling air for the stator through the gaps between adjacent poles. In the liquid-cooled rotor with the gaps between adjacent poles filled or covered respectively, in accordance with the invention, it is of advantage to provide the stator with liquid cooling for the stator winding and, if necessary, also for the stator core, using the same cooling liquid as for the pole coil conductors of the rotor. In special cases the cooling liquid for the stator core can be fed and discharged through tubes arranged on the outside of the core, which have a good heat-conductive contact with the core. These tubes can also be designed as elements for cooling the generator air.

Normally it is not necessary to provide a special liquid cooling system for the stator core, since the elimination of heat from the stator core is effected merely through the winding insulation to the cooling liquid in the winding conductors.

When using liquid cooling for the rotor and for the stator, certain heat loses are also caused in the end chambers of the machine, so that air cooling is still advisable for these chambers. By a special design of the rotor according to the invention it is possible to obtain the relatively low ventilation effect necessary for cooling the front chambers.

For example, the fillers used for filling the gaps between adjacent poles can have such a form that the desired cooling effect is achieved. When using walls for covering the gaps between adjacent poles, these can be provided with ribs or the walls can be so arranged relative to the end chambers that they exert a sufficient ventilating effect for cooling the end chambers.

The unused ventilation of the machine is considerably limited by the above described measures and the load-independent losses are thus reduced to a minimum. An improvement of the efficiency of the machine is achieved, which is important at partial load. This arrangement also has the additional advantage that the coolers, and consequently also the foundation dimensions for the machine, can be kept very small.

One suitable embodiment of the invention is illustrated in the accompanying drawing where part of a synchronous machine with salient poles is shown partly in perspective view and partly in section.

The synchronous machine comprises mainly a rotor or magnet wheel 1 with salient poles 2, and a stator 3 which is located in a casing 4. The salient poles are provided with excitation coils 5 and the stator 3 has a stator winding 6 located in slots provided in the stator core 3.

In accordance with the invention the coil conductors 5 for the salient poles 2 are provided with cooling channels 8 through which a liquid coolant, for instance water or oil, is caused to circulate and which carries away heat from the rotor 1. For the purpose of reducing the ventilation and friction losses, the interpolar gaps, i.e. the gaps between adjacent poles, are sealed off from the outside by means of side and peripherally extending walls 9, 9' respectively, as shown in the right half of the figure. The peripherally extending walls 9' are arcuate and extend from one end of the poles 2 to the other and therefore present a substantially cylindrical rotor surface thus offering a minimum loss factor. If desired, it is also possible to close off the gaps only at the sides, i.e. at the ends of the poles 2 by means of the walls 9 only and to thus omit the peripheral wall 9'. Instead of the walls 9, 9' it is also possible to fill the interpolar gaps with a non-magnetic material as is indicated on the left side of the figure where one of these gaps is shown with a non-magnetic filler 10.

The stator winding 6 is provided with cooling channels 11 through which a liquid coolant is caused to circulate in a known manner. The same liquid can be used for this purpose as is used for cooling the pole coils 5. Furthermore in some cases it may be an advantage also to cool the stator core 3. This can be achieved by arranging a series of cooling tubes 12 on the outer surface of the stator core, these tubes having good heat-conductive contact with the stator laminations. The liquid coolant generally flows through these tubes in a closed-circuit containing heat-exchangers, not shown in the drawing.

I claim:

1. In a synchronous dynamo electric machine having stator and rotor members, a winding on said stator, said rotor member being provided with salient poles spaced around the periphery thereof and windings on said poles of the direct liquid cooled type, the improvement wherein the gaps between adjacent poles are completely closed by wall surfaces thereby to reduce the friction and ventilation losses.

2. A synchronous machine as defined in claim 1 wherein said wall surfaces extend radially at opposite ends of the poles and prevent air flow through said gaps in the direction of the rotor axis.

3. A synchronous machine as defined in claim 1 wherein said wall surfaces are arcuate and extend in the peripheral direction at the circumference of the rotor.

4. A synchronous machine as defined in claim 1 wherein said wall surfaces extend radially at opposite ends of the poles and also include arcuate wall surface parts extending peripherally at the circumference of the rotor thereby effecting a complete closure of said gaps on all sides.

5. A synchronous machine as defined in claim 1 wherein the wall surfaces completely closing said gaps between adjacent salient poles are established by the end and peripheral surface portions of a filling of non-magnetic material deposited in the gaps from one end of the rotor to the other.

References Cited in the file of this patent

UNITED STATES PATENTS

| | | |
|---|---|---|
| 1,145,612 | Porter | July 6, 1915 |
| 2,539,747 | Moore | Jan. 30, 1951 |
| 2,654,848 | Schaefer | Oct. 6, 1953 |
| 2,820,914 | Rudoff | Jan. 21, 1958 |
| 2,844,745 | Hamm | July 22, 1958 |
| 2,898,484 | Krastchew | Aug. 4, 1959 |
| 2,906,208 | White | Sept. 29, 1959 |
| 3,032,665 | Wilhelmson | May 1, 1962 |